No. 891,193.
PATENTED JUNE 16, 1908.
O. C. SMITH & P. LANHAM.
MANOMETER.
APPLICATION FILED AUG. 6, 1907.
2 SHEETS—SHEET 2.
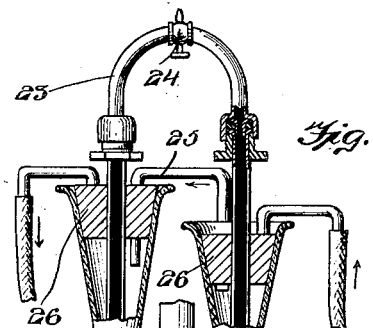
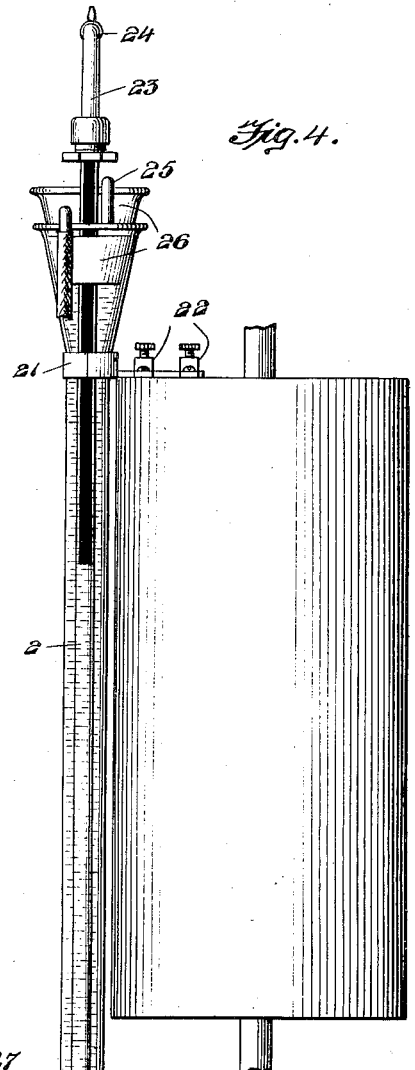
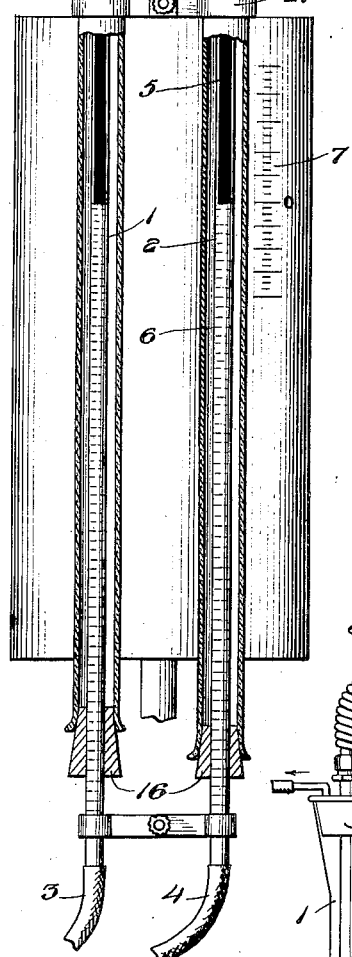
WITNESSES:
INVENTOR
Octavius C. Smith and Paul Lanham
BY
Attorney

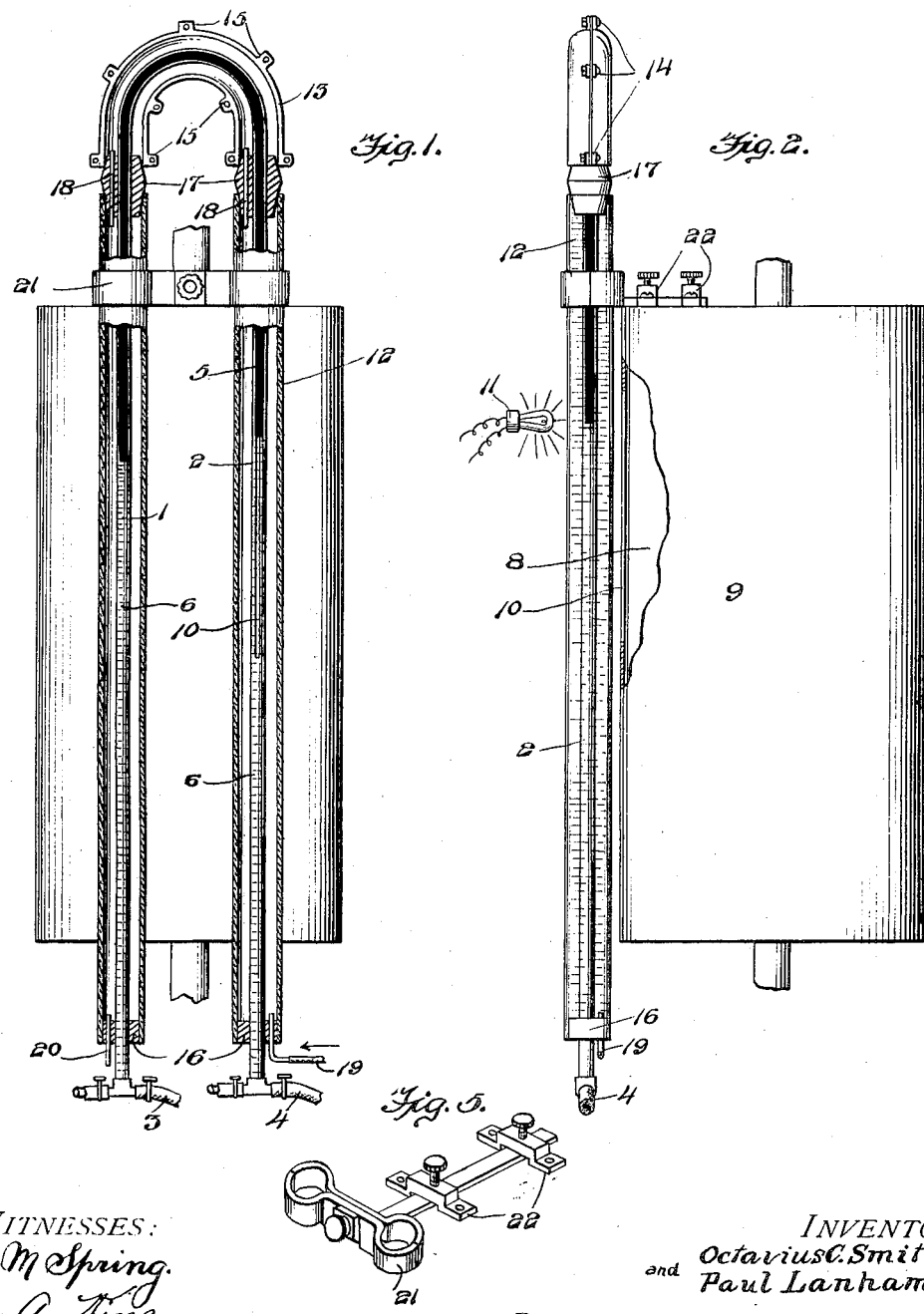

UNITED STATES PATENT OFFICE.

OCTAVIUS C. SMITH AND PAUL LANHAM, OF WASHINGTON, DISTRICT OF COLUMBIA.

MANOMETER.

No. 891,193.   Specification of Letters Patent.   Patented June 16, 1908.

Application filed August 6, 1907. Serial No. 387,383.

*To all whom it may concern:*

Be it known that we, OCTAVIUS C. SMITH and PAUL LANHAM, citizens of the United States, residing at Washington, in the District of Columbia, have invented certain new and useful Improvements in Manometers, of which the following is a specification.

Our invention relates to manometers, particularly those employed to register the flow of water in mains and record the variations in such flow to the end that leaks, and wastage from other causes may be ascertained and located; and the invention more especially has to do with improvements in the type of manometer known as the pitometer. In instruments of this character heretofore known and used, the accuracy of the readings are materially impaired by two conditions. In the first place changes in temperature due to natural causes or to the source of light used in making the photographic record effect marked fluctuations in the level of the liquid employed as an indicating medium, and, secondly, the sensitiveness of the instrument is to a considerable degree reduced by the viscosity of the liquid employed.

It is the object of our invention to overcome these difficulties and to produce an instrument which is highly sensitive, responding quickly to all variations in flow in the main and yet uninfluenced by extraneous conditions such as temperature and the like.

The invention, as hereinafter fully described and as particularly pointed out in the claims, will be readily understood from an inspection of the accompanying drawings, in which Figure 1 is an elevation of a preferred embodiment of the device; Fig. 2 is an edge view of the same, partially broken away; Fig. 3 is an elevation of a modification; Fig. 4 is an edge view of Fig. 3; Fig. 5 is a detail of a clamp employed; and Fig. 6 is a fragment showing a modification.

The manometer, as illustrated, comprises an inverted U-tube having legs 1 and 2 connected by flexible pipes 3 and 4 with the fluctuating medium to be tested. This may be, for instance, the water in a main, and the tubes 3 and 4 may terminate therein in angularly disposed open tips as exemplified in the pitometer described and illustrated in U. S. Patent 625541, although our device is adapted for use in other relations where it is desired to measure fluctuations in liquid or gaseous pressure or flow. Within the manometer tube is confined a colored liquid 5 having, preferably, a fixed specific gravity but slightly less than water, which liquid is maintained in the upper part of the tube by the water 6 in the legs of said tube; and the line of demarcation between the colored liquid 5 and the water 6 is caused to fluctuate by inequalities of pressure in the pipe or main communicated through the tubes 3 and 4 to the water in the legs 1 and 2 of the U-tube. This variation in pressure, measuring the rate of flow in the main, may be read off the index 7 (Fig. 3), or a continuous record may be obtained upon a roll 8 of sensitized paper mounted in a casing 9 to rotate before a narrow slit 10 in said casing, one leg of the manometer tube being interposed between the slit 10 and a source of actinic light 11. Thus far the construction and operation of our manometer is substantially the same as those heretofore known and as typified in the patent above referred to, with the very important difference, however, that the tube is reversed so as to form an inverted U, whereby it is made possible to employ a colored liquid, such as benzin, of a minus specific gravity and having a less viscosity than those heretofore used. By the employment of an indicating fluid slightly lighter than water, the sensitiveness of the device is enhanced.

The difficulties due to changes in temperature are overcome by the employment of a water jacket 12 about the tube. The placing of such a jacket in position presents difficulties of manufacture and expense. To avoid the bending of the tubes *in situ*, we place two large glass tubes 12 about the respective legs 1 and 2 of the manometer tube and a two-part separable metal jacket 13 about the bend in the tube, providing packing between the edges of the members and clamping them together by means of screws 14 engaging threaded lugs 15 on said members.

Rubber plugs 16, arranged in the lower extremities of the tube 12 and plugs 17 connecting the said tubes at their upper ends with the metallic jacket 13, constitute water tight closures through which small tubes 18 give connection throughout the jacket for a cooling current of water entering at 19 and leaving at 20.

A clamp 21, clasping the two legs of the jacketed tube, is arranged to support the tube for vertical adjustment on the recorder case, keepers 22 providing for horizontal adjustment, whereby the tube may be accurately positioned relative to the scale or photographic drum.

In the modified construction shown, the U-tube is not a bent continuous tube, but its upper portion is formed of a metallic section 23 provided with a cock 24 and connecting the two legs 1 and 2 by means of suitable nuts and packing as shown in Fig. 3 in section. The cock 24 serves to discharge any air trapped in the tube and as an inlet for the indicating fluid 5. In this case, the water jacket does not include the part 23, the flow of cooling water being from one leg to the other through tubes 25 fixed in conical plugs 26 arranged in the upper flaring ends of the members of the jacket 12 about the legs 1 and 2. This construction makes for economy in the replacing of the U-tube where one of the legs is accidentally broken.

A further arrangement is shown in Fig. 6, where the metallic section 23 is surrounded by a jacket in the form of a coil 27 by which, instead of the pipe 25 of Fig. 3, the cooling water flows from one leg to the other.

In the specification and claims, by the language equalizing of the temperature of the tube and the employing of a cooling medium, is to be understood the maintenance of an equable temperature, whether higher or lower at any particular time, than that of the surrounding atmosphere, and not necessarily the reducing of the temperature.

Having thus fully set forth our invention, what we claim is:

1. In a manometer, a U-tube arranged to receive a fluid in its medial portion, the two extremities of the tube adapted to be connected to the body to be tested, and means to counteract surrounding temperature variations whereby the temperature of the tube is maintained constant.

2. In a manometer, an inverted U-tube arranged to receive in its upper portion a fluid dissimilar to that to be tested, and the legs of the tube adapted to be connected to the body of fluid to be tested, in combination with means to counteract surrounding temperature variations whereby the temperature of the tube is maintained constant.

3. In a manometer, the combination, with a pressure indicating device, of a jacket about the same, and means to supply to said jacket a cooling medium.

4. In a manometer, a tube arranged to receive an indicating fluid, the interior of the tube adapted to be placed in open communication with the body to be tested, and means to counteract surrounding temperature variations whereby the temperature of the tube is maintained constant.

5. In a manometer, the combination with a U-tube, and a connection between said tube and the body to be tested, of a jacket about said tube, and means to pass a cooling current through said jacket.

6. In a manometer, the combination, with a U-tube, and a connection between said tube and the body to be tested, of a larger tube about each leg of the tube, plugs in the end of the large tubes, a connection between the large tubes, and a water supply to the end of one of the large tubes and an outlet from the opposite end of the other large tube.

7. In a manometer, an inverted U-tube arranged to receive an indicating fluid in its upper portion, and a connection between the lower portion of the tube and the body to be tested, in combination with a jacket about said inverted tube, and means to pass a cooling current through said jacket.

8. In a manometer, an inverted U-tube arranged to receive an indicating fluid in its upper portion, and a connection between the lower portion of the tube and the body to be tested, in combination with larger tubes arranged about the two legs of the U-tube, a connection between the upper ends of the large tubes, a water supply to the lower end of one large tube, and an outlet from the lower end of the other large tube.

9. In a manometer, an inverted U-tube arranged to receive an indicating fluid in its upper portion, and a connection between the lower portion of the tube and the body to be tested, in combination with larger tubes arranged to inclose the two legs of the U-tube, a separable jacket to inclose the bend of the U-tube, connections between the upper ends of the large tubes and the separable jacket, a water inlet to the lower end of one large tube and an outlet from the lower end of the other large tube.

10. In a manometer, an inverted U-tube arranged to receive in its upper portion an indicating fluid of different color from the body of fluid to be tested, and a connection between the legs of the tube and the body to be tested, in combination with larger tubes arranged to inclose the two legs of the U-tube, a separable jacket to inclose the bend of the U-tube, connections between the upper ends of the large tubes and the separable jacket, a water inlet to the lower end of one large tube and an outlet from the lower end of the other large tube.

11. In a manometer, an inverted U-tube having in its upper portion a colored indicating fluid, and a connection between the legs of the tube and the body to be tested, in combination with larger tubes arranged to inclose the two legs of the U-tube, a separable jacket to inclose the bend of the U-tube, connections between the upper ends of the large tubes and the separable jacket, a water inlet to the lower end of one of the large tubes and an outlet from the other large tube, a suitable support, a light-source, keepers secured to the support, a clamp having two arms arranged to embrace the respective legs of the jacketed U-tube and a projecting bar to enter the keepers, and set screws to position the bar in the keepers.

In testimony whereof we affix our signatures in presence of two witnesses.

OCTAVIUS C. SMITH.
PAUL LANHAM.

Witnesses:
L. T. GREIST,
EDWIN O. HILDEBRAND.